Figure 1:
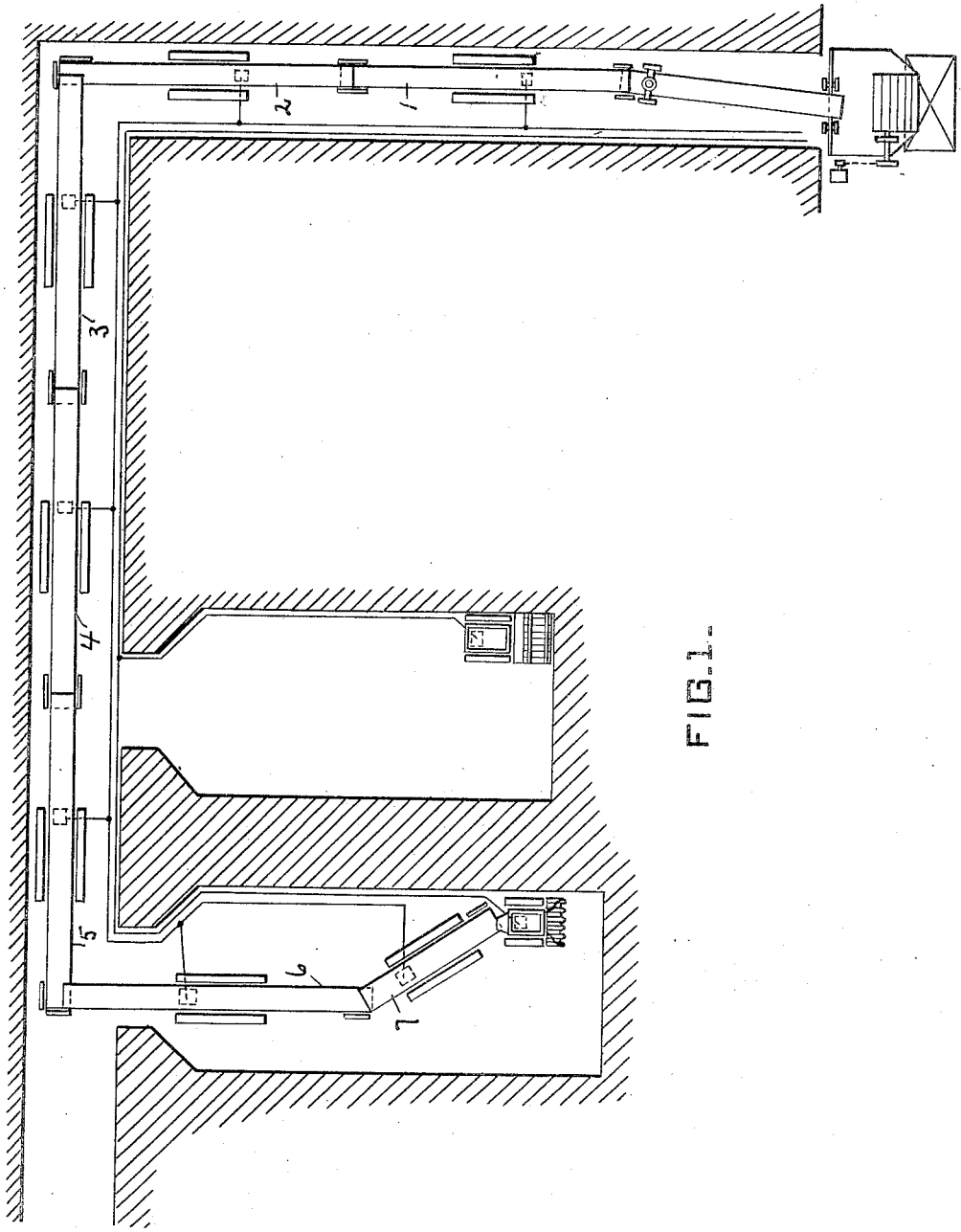

Feb. 13, 1923.

G. R. BENNETT

CONVEYING SYSTEM

Filed Nov. 1, 1918

1,444,775

5 sheets-sheet 1

INVENTOR
George R. Bennett
by Dennis S. Wolcott
Atty

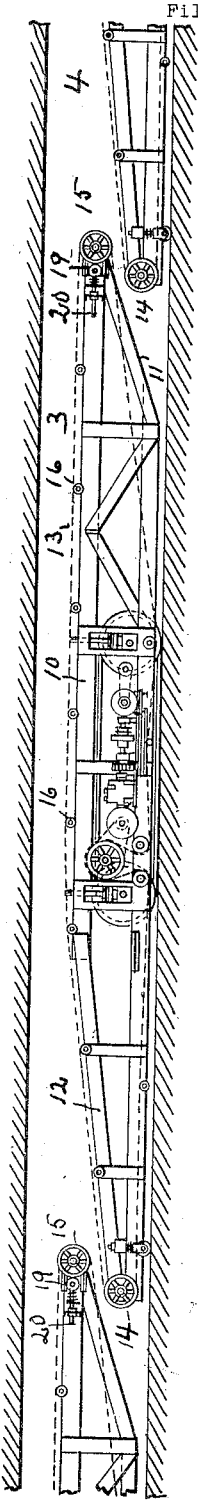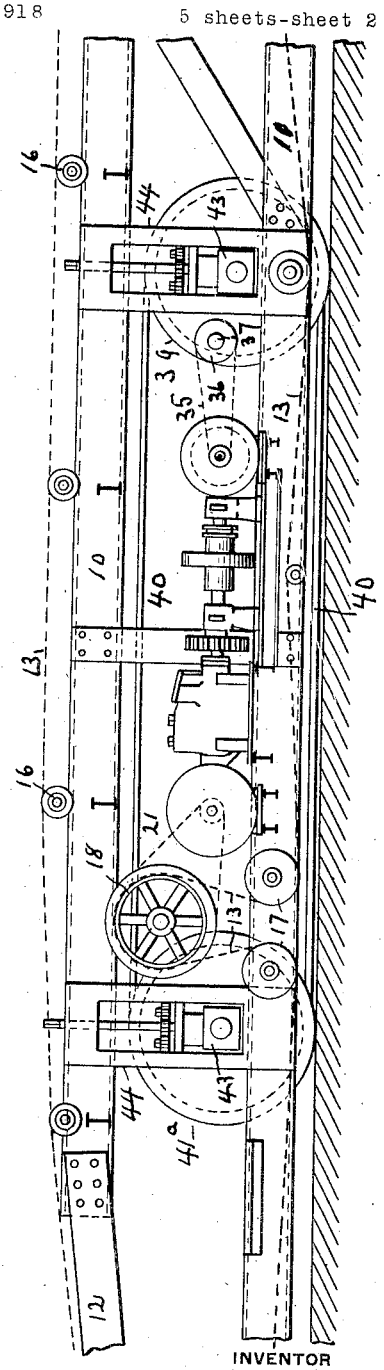

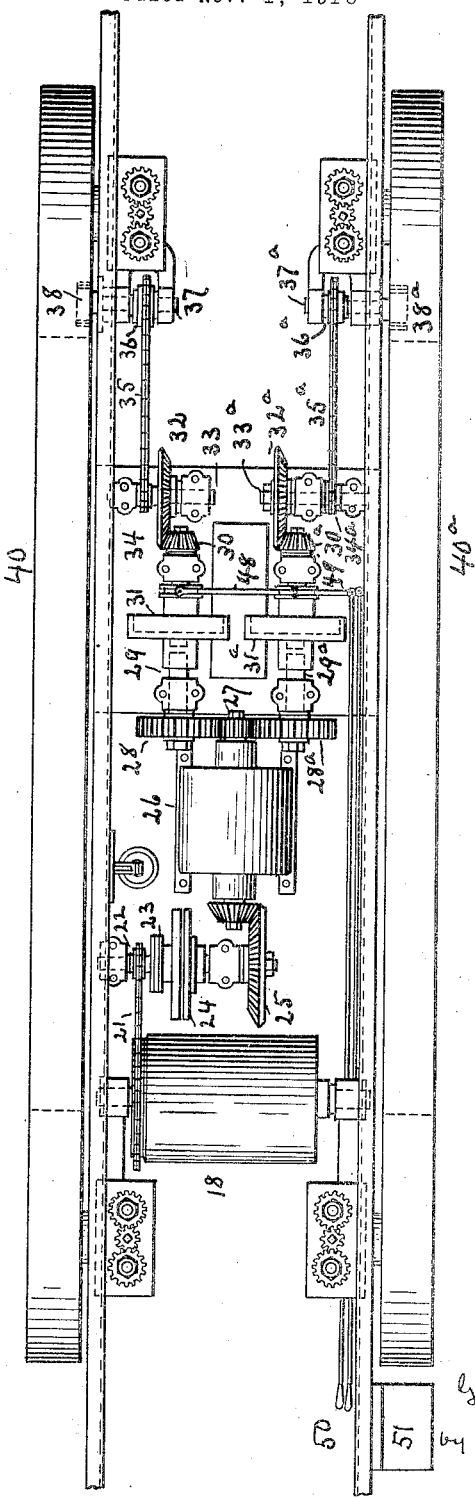

Feb. 13, 1923.
G. R. BENNETT
1,444,775
CONVEYING SYSTEM
Filed Nov. 1, 1918
5 sheets-sheet 4
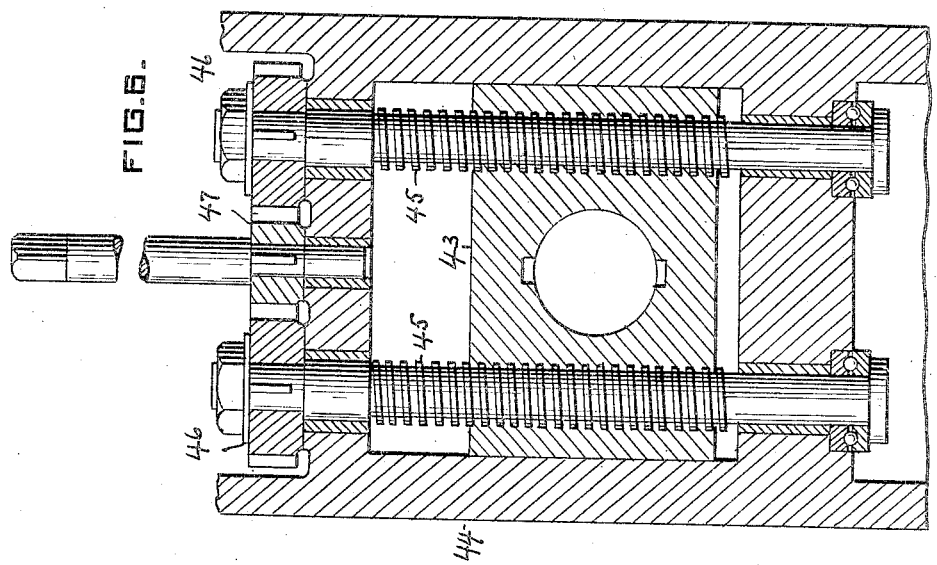
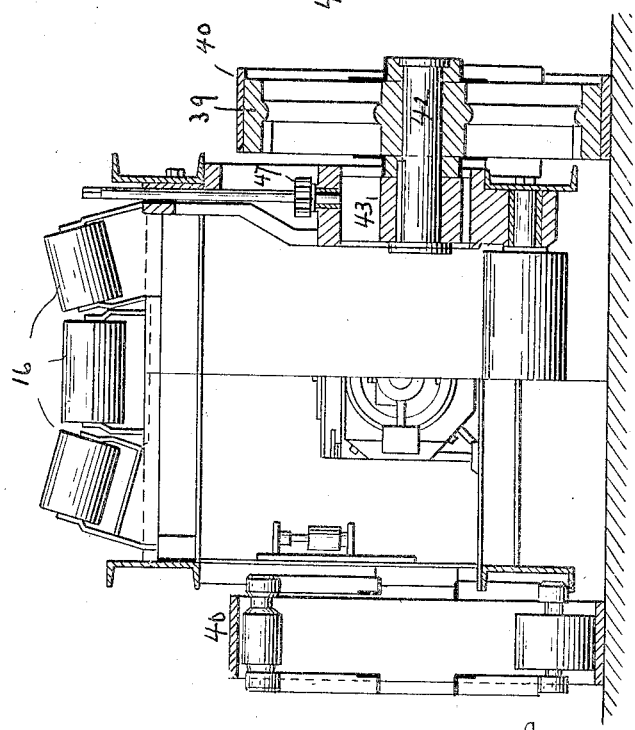
INVENTOR
George R. Bennett
by Dennis S. Wolcott
atty

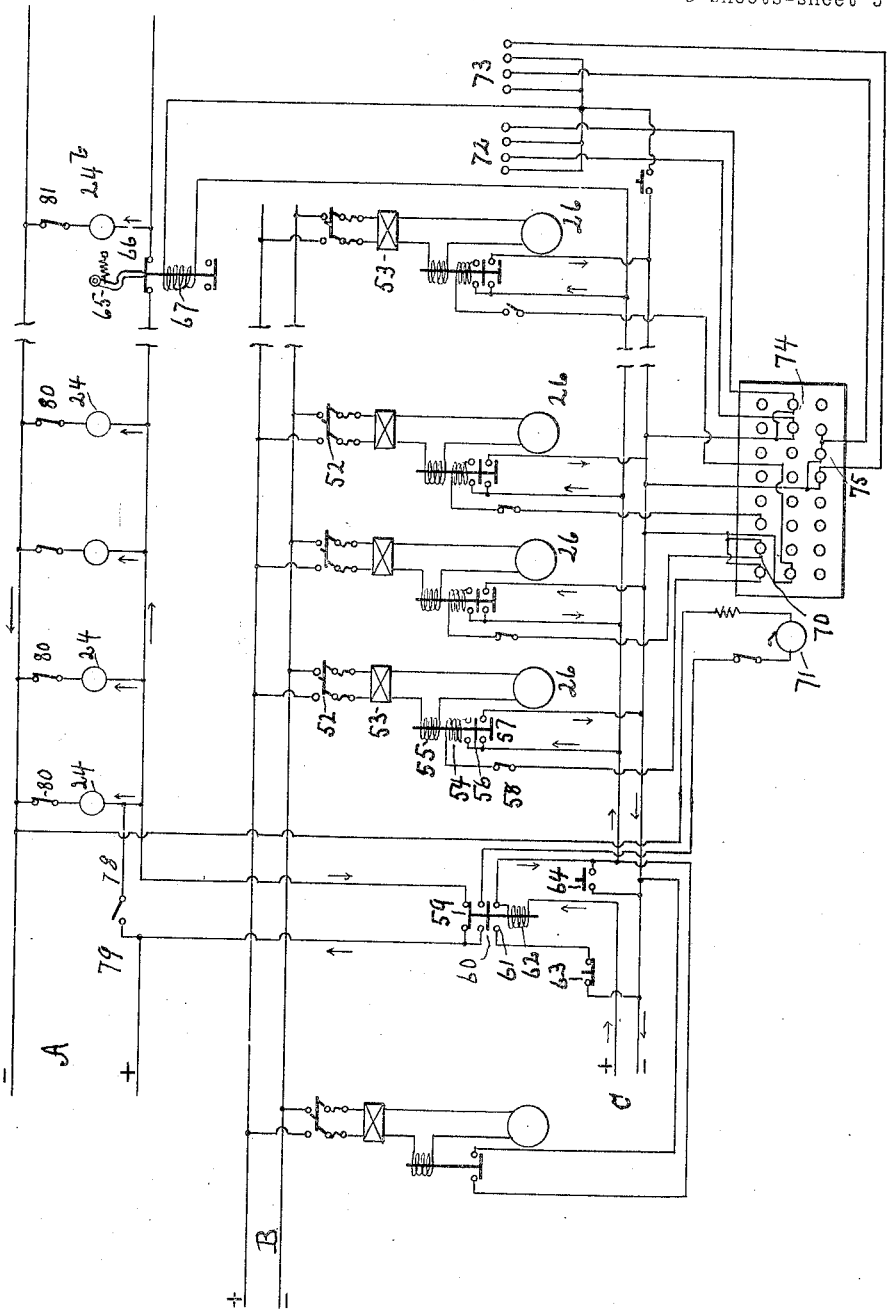

Patented Feb. 13, 1923.

1,444,775

UNITED STATES PATENT OFFICE.

GEORGE R. BENNETT, OF PITTSBURGH, PENNSYLVANIA, ASSIGNOR TO ALBERT M. HANAUER, OF PITTSBURGH, PENNSYLVANIA.

CONVEYING SYSTEM.

Application filed November 1, 1918. Serial No. 260,740.

*To all whom it may concern:*

Be it known that I, GEORGE R. BENNETT, residing at Pittsburgh, in the county of Allegheny and State of Pennsylvania, a citizen of the United States, have invented or discovered certain new and useful Improvements in Conveying Systems, of which improvements the following is specification.

It is customary to employ cars running on tracks and propelled manually, or by mules, traction mechanism or motors, but no matter how propelled, such a system is necessarily intermittent in operation and therefore inefficient, for the reason that empty cars must be returned to the point of loading, and this involves the use of sidings to permit the passing of loaded and empty cars; such system is also objectionable on account of the labor employed in its operations.

It is obvious that any system for removing material from tunnels etc., should be capable of continuous operation, as is characteristic of belt conveying systems, and also of extension from time to time, but the difficulty and expense involved in extending belt conveying systems of the type now employed has precluded the use of such systems in mining operations.

The invention described herein has for its object the provision of a sectional belt conveying system, each section or unit being substantially similar to all the other sections, so that the length of the system can be changed by adding or removing sections, and a new section can be quickly substituted for an inoperative section. It is a further object of the invention to embody with each section means for operating its belt, and also to make each section self-propelling, so as to facilitate the placing of the sections in position and the removal of inoperative sections.

The invention has also for its object the combining of such a system with automatic loading mechanism and terminal discharge mechanism and to so connect the sections and the loading and discharging mechanisms to a common source of power through interlocking safety devices that in case of an accident to any of the sections or mechanisms, the whole system is stopped, and the location of the accident is indicated.

The invention is hereinafter more fully described and claimed.

In the accompanying drawings forming a part of this specification, Fig. 1 is a sectional plan of a coal mine, having my improved system and apparatus installed therein; Fig. 2 is a vertical section through a portion of the mine showing one complete section and portions of adjacent sections or units of the conveying means in elevation; Fig. 3 is a side elevation of a portion of one of the units on an enlarged scale; Fig. 4 is a top plan view of the portion of a unit shown in Fig. 3; Fig. 5 is a sectional elevation on a plane indicated by the line V—V, Fig. 4; Fig. 6 is a sectional detail of means for leveling a section or unit, and Fig. 7 is a diagrammatic view of operating, controlling and signalling circuits, etc.

In the practice of the invention described herein, the conveying means are formed by a plurality of sections 1, 2, 3, etc. or units arranged in operative relation one to the other, extending from a loading machine along a passage or passages to discharging mechanism at the adit of the mine or tunnel. The several units are made substantially similar in construction, each consisting of suitable side frames 10, formed of channels or other suitable shapes and transversely braced to render the structure rigid. At one end the under cords 11 of the side frames are given an upward inclination, so that the end of an adjacent unit 4 may extend under the elevated end of the unit 3, etc. while the top cord 12 at the opposite end of the latter unit or unit 3 is downwardly inclined as shown in Fig. 2. This construction of the end portions of the units permits of the overlapping of the ends of adjacent units, so that material can be discharged from one unit onto an adjacent unit. The conveying belt 13 passes around guide pulleys 14 and 15 at the respective ends of the unit, above the supporting and guiding rollers 16, around guide pulleys 17 and the driving drum 18. In order to maintain the belt under proper tension, the guide pulley at one end, as 15, has its journals mounted in blocks 19, which are arranged in suitable guides and are shiftable by screws 20. The driving drum 18 is driven by a sprocket chain 21 passing around a pulley 22 on a sleeve loosely mounted on a shaft 23, said sleeve being adapted to be operatively connected to the shaft by a magnetic clutch mechanism 24. A bevelled gear wheel 25 is engaged by a correspondingly shaped pinion on the armature of the motor 26 and on the opposite end of the armature shaft is secured a pinion 27 engaging the oppositely disposed gear wheels 28, 28ª secured on shafts 29, 29ª which are adapted to drive the pinions 30, 30ª through suitable clutch mechanisms 31, 31ª. These pinions engage respectively the gear wheels 32, 32ª on shafts 33, 33ª on which are secured sprocket wheels 34, 34ª. The sprocket chains 35, 35ª pass sprocket wheels 36, 36ª on short shafts 37, 37ª having keyed thereto pinions 38, 38ª engaging teeth on the inner surfaces of the peripheries of the drums 39, 39ª. Belts 40, 40ª having spaced blocks thereon pass around the drums 39, 39ª and similar drums 41, 41ª. The several drums are secured on stub shafts 42 which have their inner ends mounted in blocks 43 vertically movable in housings 44. These blocks are adjustable by right and left hand screws 45, which are adapted to be rotated by pinions 46 intermeshing with toothed wheels 47 secured on the upper ends of the screws as shown in Figs. 5 and 6.

The drums 39, 39ª and 41, 41ª are so located on the frame of the unit as to form a firm support therefor, and as the screws 45 are fixed as against longitudinal movement in the housings, the frame of the unit can be levelled by properly turning one or more of the adjusting screws. As hereinbefore stated and as clearly shown in Fig. 4, the drums 41, 41ª have independent driving connections to the motor and in these lines of connection are included clutch mechanisms 31, 31ª. The direction of movement of the unit can be changed by shifting one or the other of the clutches. These clutches are shiftable by levers 48, 49ª, which are connected by rods to operating handles 50 arranged adjacent to the operative platform 51.

As will be readily understood by those skilled in the art, a conveying unit as hereinbefore described can be used alone or in combination with any number of similar units. It is also apparent that adjacent units can be arranged either in line or at angles to one another. As the units are wholly self supporting, any unit which may become inoperative can be removed and another substituted. As the units are self propelled, such substitution can be easily effected.

While in practice only one main circuit will be employed, for clearness and convenience three circuits are shown in Fig. 7. The circuit A has the magnetic clutches 24 of the several units and the similar clutches of the loading mechanism and discharging mechanism connected thereto in multiple arc and is controlled by a make-and-break device 59. The motors 26 employed for operating the belts of the several units and for shifting the units are included in branch circuits of the main circuit, said branch circuit also including hand operated switches 52 controllers 53 and overload relays 55.

If while in operation an accident should occur causing the stoppage of the conveying belt of one of the units, as for example, unit 1, the relay 55 which is preferably made in the form of a solenoid will become sufficiently energized to close switches 56 and 57. The closing of switch 56 closes the circuit including solenoid 62 which will become energized and the movement of its core will open the switch 59 thereby opening the clutch circuit and thereby releasing the clutches 24 of all the conveyor units. As the breaking of the clutch circuit would effect a de-energization of the relay 55, a holding relay 54 is included in the circuit controlled by switch 56 so as to hold such switch closed until broken by the hand operated switch 58. The closure of switch 57 will permit current in circuit C to flow through a red lamp 70 on the signal board, thereby giving a warning to the attendant of the accident and which unit needs attention. The movement of the core of solenoid 62 whereby the clutch circuit is opened, will also close switch 60 in the circuit of the alarm bell 71.

It is preferred to employ a loading mechanism of the type or construction shown and described in application Serial Number 260741 filed November 1st, 1918. As set forth in said application, provision is made to close signalling and switch circuits in case of accidents to the reciprocating shovels or the spiral feeders, the contact points of such switches in said circuits being indicated at 72 and 73 and the closure of the circuits will permit current to flow through the white or blue lamp 74 or 75 on the signal board and through the controlling solenoid 62 and a solenoid 67 controlling the switch 66 in the clutch circuit A so that in case of a stoppage of the shovels and spiral feeders of the loading machine, the magnetic clutch of the latter and the clutches of the several conveyor units will be released and the operation of the system stopped. In order to prevent a starting of the loader while being repaired or the cause of its stoppage removed, a detent 65 of any suitable form or construction is provided to hold switch 66 open until the detent is shifted by the operator.

It will be observed that as long as the closing coils 55 and 67 are energized by reason of overload or any other cause, the master coil 62 will be energized and the clutch circuit opened. The opening of the clutch circuit is accompanied by the closing of a second circuit through the master coil 62, so that the clutch circuit will remain open even when the cause of the trouble has been removed, until the switch 63 in the second circuit through coil 62 has been opened. This switch will not be opened until the operator at the signal board has been notified by the disappearance of the light that the system is in operative condition.

It will be understood that each conveyor or unit has arranged thereon coils 55 and 56, the switches operated by said coils and also the normally closed hand operated switch 58 in the light circuit, so that as soon as an attendant has removed the cause of the stoppage of any unit he can open said switch to signal the operator at the signal board, which together with the master coil 62, switches 59, 60 and 61 controlled by said coil and the starting and stopping switches 63 and 64 are preferably arranged on the loading machine.

As it may be desired to operate the feeding machine at the entrance to the mine, while the conveyors and loading machine are out of operation, a circuit 78 and having a hand operative switch 79 is provided to close the clutch circuit through the magnetic clutch of the feeder mechanism. When the switch 79 is closed the hand operated switches 80 controlling the circuits through the magnet clutches 24 on the conveyor units should be opened, and also the switch in the circuit of the magnetic clutch 24$^b$ of the loading machine.

I claim herein as my invention:

1. A conveying system having in combination a plurality of independent units each provided with conveying means, means operative from the common source of driving the several conveying means, and means automatically operative in case of accident to one of the units for stopping all of the units.

2. A conveying system having in combination a plurality of units each unit provided with conveying means, means for driving the conveying means and means automatically operative in case of stoppage of one of the units for stopping all the units and indicating the locality of the cause of the stoppage.

3. A conveying system having in combination a plurality of independent units each provided with conveying means, and means for operating the same, a loading machine, means for operating the loading machine, and means for stopping the conveying means and the loading machine and automatically operative in case of accident to any of the units or the loading machine.

4. A conveying system having in combination a plurality of independent units each provided with conveying means, means operative from a common source for driving the several conveying means, means automatically operative in case of accident to one of the units for stopping all the units and means for preventing the operation of one of the conveying units until the injured member has been repaired or replaced.

5. A conveying system having in combination a plurality of independent units each provided with conveying means, means for operating the same; a loading machine, means for operating the loading machine, means for stopping the conveying means and the loading machine and automatically operative in case of accident to any of the conveying units or the loading machine, and means for preventing the operation of the conveying members and loader until the injured member has been repaired or replaced.

In testimony whereof, I have hereunto set my hand.

GEORGE R. BENNETT.